(12) United States Patent
Cohen et al.

(10) Patent No.: US 9,158,521 B2
(45) Date of Patent: Oct. 13, 2015

(54) AUTOMATIC PROVISIONING OF A SOFTWARE PLATFORM TO A DEVICE ECOSYSTEM

(71) Applicant: Google Inc., Mountain View, CA (US)

(72) Inventors: Gabriel Cohen, Mountain View, CA (US); Attila Bodis, Mountain View, CA (US); Ficus Kirkpatrick, Mountain View, CA (US); Hiroshi Lockheimer, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/156,258

(22) Filed: Jan. 15, 2014

(65) Prior Publication Data

US 2014/0137094 A1    May 15, 2014

Related U.S. Application Data

(63) Continuation of application No. 13/672,005, filed on Nov. 8, 2012, now Pat. No. 8,667,486.

(60) Provisional application No. 61/664,670, filed on Jun. 26, 2012.

(51) Int. Cl.
*G06F 9/44* (2006.01)
*G06F 15/16* (2006.01)
*G06F 9/445* (2006.01)
*G06F 9/54* (2006.01)
*H04L 29/08* (2006.01)

(52) U.S. Cl.
CPC .. *G06F 8/60* (2013.01); *G06F 8/65* (2013.01); *G06F 9/541* (2013.01); *H04L 67/16* (2013.01)

(58) Field of Classification Search
CPC ............. G06F 9/541; G06F 8/60; G06F 8/65; H04L 67/16
See application file for complete search history.

(56) References Cited

U.S. PATENT DOCUMENTS

| 6,021,445 A | 2/2000 | Chapa |
| 7,730,478 B2 | 6/2010 | Weissman |
| 8,108,854 B1 | 1/2012 | Wiggins et al. |

(Continued)

OTHER PUBLICATIONS

Roover et al., Multi-dimensional exploration of API usage, May 2013, 10 pages.*

(Continued)

*Primary Examiner* — Thuy Dao
(74) *Attorney, Agent, or Firm* — McDonnell Boehnen Hulbert & Berghoff LLP

(57) ABSTRACT

A method for automatically provisioning a platform implementation package to a client device may include receiving from an application executing on the client device, a request for functionality. The request may be received via a client library distributed with the application, and may be for functionality provided by the platform implementation package. The platform implementation package may provide functionality that is not provided by the client library. It may be further automatically determined, by the client device, that the functionality requires an update to the platform implementation package. In response, a request for the update to the platform implementation package may be communicated to a computing system. The update to the platform implementation package may be received from the computing system and installed on the client device. The requested functionality may be provided to the application by the updated platform implementation package.

20 Claims, 7 Drawing Sheets

(56) References Cited

U.S. PATENT DOCUMENTS

| | | | |
|---|---|---|---|
| 8,156,489 B2 | 4/2012 | Kane | |
| 8,370,818 B2* | 2/2013 | Osminer et al. | 717/140 |
| 8,434,055 B2* | 4/2013 | Budinsky et al. | 717/104 |
| 8,606,636 B1* | 12/2013 | Keoshkerian | 705/14.5 |
| 8,667,486 B2* | 3/2014 | Cohen et al. | 717/176 |
| 8,843,941 B2* | 9/2014 | Moore | 719/316 |
| 2002/0068554 A1 | 6/2002 | Dusse | |
| 2003/0066065 A1 | 4/2003 | Larkin | |
| 2003/0187929 A1 | 10/2003 | Pugh et al. | |
| 2004/0261086 A1* | 12/2004 | Jensen et al. | 719/328 |
| 2006/0136423 A1* | 6/2006 | Lee et al. | 707/10 |
| 2007/0156974 A1* | 7/2007 | Haynes et al. | 711/147 |
| 2008/0028387 A1 | 1/2008 | Nakagawa et al. | |
| 2011/0321032 A1 | 12/2011 | Ciccone | |
| 2012/0046069 A1 | 2/2012 | Cupala et al. | |
| 2012/0131538 A1 | 5/2012 | Das | |
| 2012/0131539 A1 | 5/2012 | Das | |
| 2012/0144378 A1 | 6/2012 | Shah | |
| 2012/0173612 A1 | 7/2012 | Vegesna-Venkata et al. | |
| 2012/0222120 A1 | 8/2012 | Rim et al. | |
| 2012/0254825 A1 | 10/2012 | Sharma et al. | |
| 2013/0111467 A1 | 5/2013 | Sundararaj | |
| 2014/0279543 A1* | 9/2014 | Ruhrig | 705/44 |

OTHER PUBLICATIONS

Asif et al., Admission control protocols in mobile ad hoc networks provisioning QoS, Dec. 2009, 4 pages.

Goncalves et al., A service architecture for sensor data provisioning for context-aware mobile applications, Mar. 2008, 7 pages.

International Search Report for corresponding international application No. PCT/US20131045106 mailed Sep. 18, 2013.

Written opinion for corresponding international application No. PCT1US20131045105 mailed Sep. 18, 2013.

Non-final Office Action mailed Dec. 23, 2014 in U.S. Appl. No. 14/156,280.

Final Office Action mailed May 28, 2015 in U.S. Appl. No. 14/156,280.

* cited by examiner

AUTOMATIC PROVISIONING OF A SOFTWARE PLATFORM TO A DEVICE ECOSYSTEM

CROSS-REFERENCE TO RELATED APPLICATIONS/INCORPORATION BY REFERENCE

This application is a continuation of U.S. patent application Ser. No. 13/672,005 filed Nov. 8, 2012, the entire contents of which are hereby incorporated by reference.

This application claims the benefit of U.S. Provisional Application Ser. No. 61/664,670, filed on Jun. 26, 2012, entitled "AUTOMATIC PROVISIONING OF A SOFTWARE PLATFORM TO A DEVICE ECOSYSTEM," which is incorporated herein by reference in its entirety.

TECHNICAL FIELD

Aspects of the present application relate generally to the field of data processing. More specifically, certain implementations of the present disclosure relate to automatic provisioning of a software platform to a device ecosystem.

BACKGROUND

With the increased popularity of mobile devices, it is often times challenging to create a seamless application developer and user interaction across a diverse set of such mobile devices running different software platform releases. For example, if a developer includes developer application programming interfaces (APIs) in the device software platform itself, then the developer experience is fragmented by each platform release having different APIs and capabilities. For example, an older version of a mobile device software platform may utilize one method of handling authentication tokens, while a subsequent version of the software platform may use a different method. In this regard, each application developer then has to implement the specific feature being addressed by a given API multiple times to cover the breadth of available devices working under different software platforms.

Additionally, if developer APIs are included in client libraries bundled with applications, then those client libraries can be running at different version levels on a single mobile device, creating a fragmented user experience since the same feature will be covered by different APIs running under different client library versions. For example, a video player may be included as a client library inside applications A and B installed on a mobile device. However, application A may have an old version of the client library implementing an older version of the video player with a slightly different user interface than the newer version of the video player that is being implemented by a more recent client library used in application B.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for automatic provisioning of a software platform to a device ecosystem, substantially as shown in and/or described in connection with at least one of the figures, as set forth more completely in the claims.

In accordance with an example embodiment of the disclosure, a method for automatically provisioning a platform implementation package to a client device may include receiving at the client device and from an application executing on the client device, a request for functionality. The request may be received via a client-resident client library distributed with the application. The request may be for functionality provided by the platform implementation package. The platform implementation package may provide functionality that is not provided by the client library. The client device may automatically determine that the functionality requires an install of the platform implementation package or an update to the platform implementation package.

In response to the determining, a request for the update to the platform implementation package may be communicated to a computing system. The client device may receive from the computing system the update to the platform implementation package. The update to the platform implementation package may be installed on the client device. The updated platform implementation package may provide the requested functionality to the application. The request for the functionality may be communicated upon initial execution of the application by the client device. The request for the functionality may be communicated after initial execution of the application by the client device. The automatic determining may include determining that the platform implementation package is outdated, determining that the platform implementation package is not installed in the client device, or determining that the platform implementation package is disabled.

The determining that the platform implementation package is outdated may include performing a version dependency check by comparing a version of the client library with a version of the platform implementation package. Prior to the communicating, the client device may display a dialog interface for receiving user confirmation of the request for the update, by calling a method in the client library for the displaying of the dialog interface. An update to the client library may be received from the computing system together with the update to the platform implementation package. The request may be received via the client library using inter-process communication (IPC). The communicating of the request for the update to the platform implementation package to the computing system may be deferred until at least another update is required for at least another application executing on the client device.

In accordance with another example embodiment of the disclosure, a method for automatically provisioning a platform implementation package to a client device may include receiving at the client device and from an application executing on the client device, a request for functionality. The request may be received via a client-resident client library distributed with the application. The request may be for functionality provided by the platform implementation package. The client device may determine whether the platform implementation package performing the functionality requires an update. If the platform implementation package requires an update, a request for updating the platform implementation package may be communicated to a computing system. If the platform implementation package requires an update, the functionality within the client device may be disabled.

The disabling may take place if the functionality is not required by the application executing on the client device. If the functionality does not require an update, the functionality may be performed using the platform implementation package installed on the client device. The functionality provided by the platform implementation package may not provided by the client library. The client library may be a thin client library.

In accordance with yet another example embodiment of the disclosure, a method for automatically provisioning a platform implementation package to a client device may include receiving, from a client device executing an application with a client library, a request for an update to a platform implementation package. In response to the request, communicating the update to the platform implementation package to the client device. The platform implementation package may be operable to perform at least one functionality associated with the client library. The platform implementation package may be distributable to at least a plurality of other client devices executing corresponding applications with the client library.

The communicating of the update to the platform implementation package to the client device may take place automatically upon receiving the request from the client device. The update of the platform implementation package may be pushed to the client device, without any communication from the application or from a user of the client device. The pushing of the update may take place automatically, at a predetermined time interval.

These and other advantages, aspects and novel features of the present disclosure, as well as details of illustrated implementation(s) thereof, will be more fully understood from the following description and drawings.

DETAILED DESCRIPTION

Figure 1:
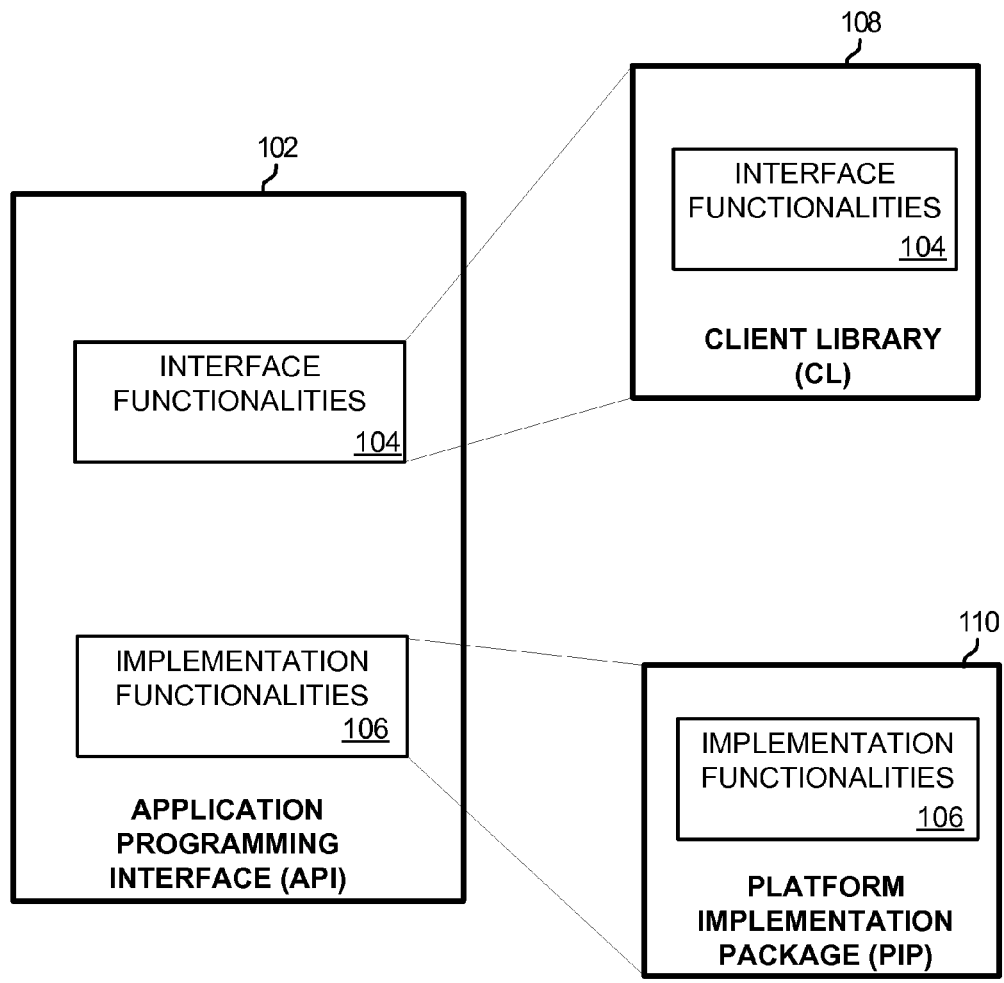
FIG. 1 is a block diagram illustrating a multi-part API, in accordance with an embodiment of the disclosure.

The present disclosure relates to a method and system for automatic provisioning of a software platform to a device ecosystem. In various implementations, the interaction between application developers, users and a provisioning network may be further improved by implementing a multi-part application programming interface (API) and automatically provisioning at least a portion of the multi-part API to devices within a device ecosystem. More specifically, functionalities for a given API may be separated into at least two groups—interface functionalities (which are not likely to change over time), and implementation functionalities (which are likely to be dynamic and change over time, requiring subsequent updates). The interface functionalities may be implemented in a client library, which may be used by a developer to be implemented in a device application. The implementation functionalities may be implemented in a service application (or a platform implementation package), which may be automatically provisioned and automatically updated throughout the device ecosystem. In this regard, by separating the implementation functionality in a platform implementation package and automatically updating it throughout the device ecosystem, there is no need to publish a new application due to updates in the API or the operating software.

For example, a method for automatically provisioning a platform implementation package to a client device may include receiving at the client device and from an application executing on the client device, a request for functionality. The request may be received via a client-resident client library distributed with the application. The request may be for functionality provided by the platform implementation package, which functionality is not provided by the client library. It may be further automatically determined, by the client device, that the functionality requires an install of the platform implementation package or an update to the platform implementation package. In response to the determining, a request for the update to the platform implementation package may be communicated to a computing system. The update to the platform implementation package may be received from the computing system. The update to the platform implementation package may be installed on the client device. The requested functionality may be provided to the application by the updated platform implementation package.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "e.g.," introduces a list of one or more non-limiting examples, instances, or illustrations.

FIG. 1 is a block diagram illustrating a multi-part API, in accordance with an embodiment of the disclosure. Referring to FIG. 1, there is shown an application programming interface (API) 102. The API 102 may comprise suitable code that may be operable to provide a plurality of functionalities. For example, the API 102 may provide interface functionalities 104 and implementation functionalities 106. The interface functionalities 104 may comprise suitable code that may be operable to provide an interface to the API 102 (e.g., a developer may use the interface functionalities 104 to interface to, and call, the API 102. The implementation functionalities 106 may comprise suitable code that may be operable to implement one or more features of the API 102.

In an example embodiment of the disclosure, the interface functionalities 104 and the implementation functionalities 106 may be separated from the API 102. For example, the interface functionalities 104 may be implemented in a client library (CL) 108. The client library 108 may be a thin client library, for example. Additionally, the implementation functionalities 106 may be implemented in a platform implementation package (PIP) 110. The PIP 110 may be, for example, an application package (e.g., an application package (.APK) file), which may be installed in a client device and may be used to implement given functionalities required by an application.

Figure 2A:
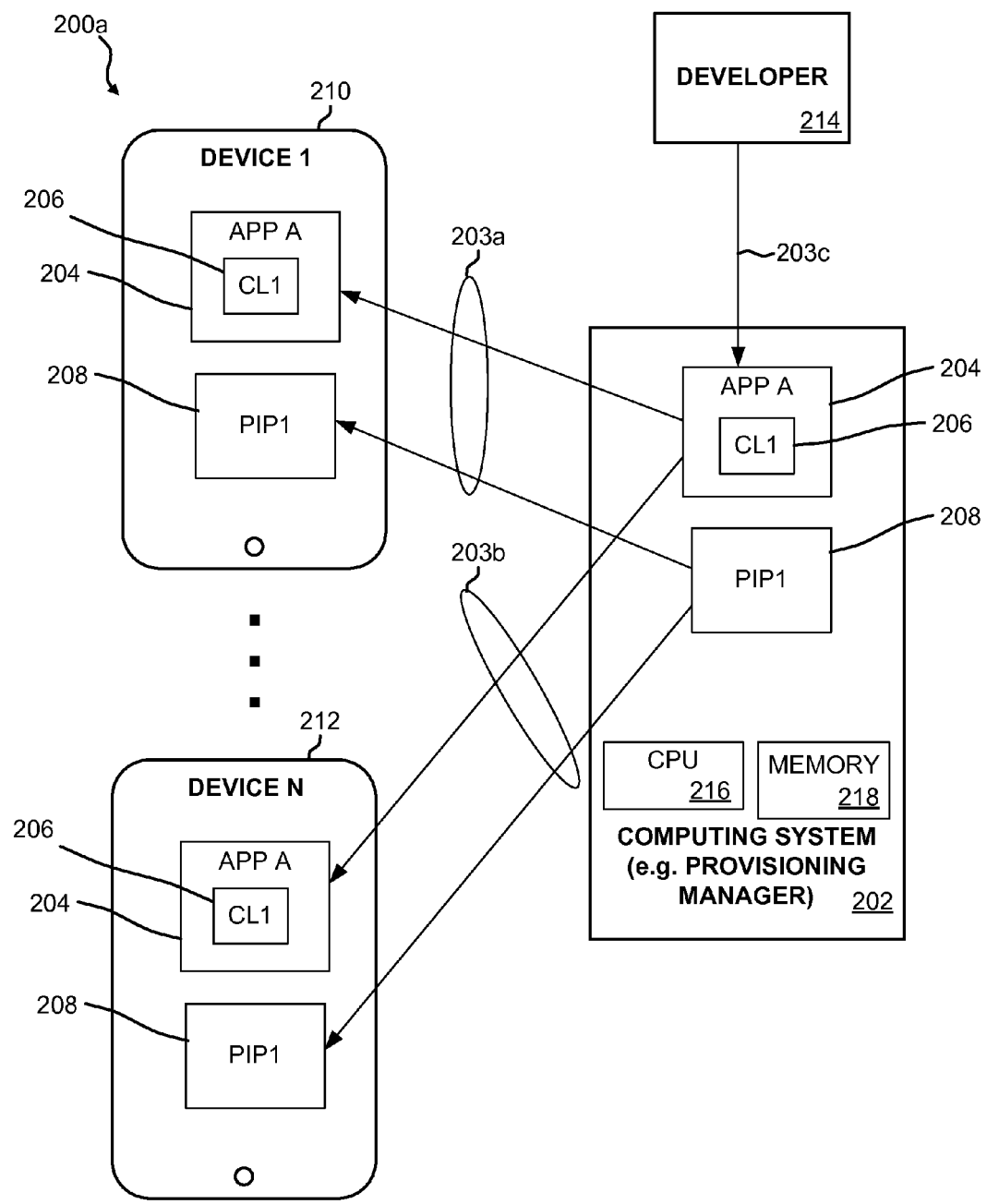
FIG. 2A is a block diagram illustrating automatic provisioning of a software platform to a device ecosystem, in accordance with an embodiment of the disclosure.
Figure 2B:
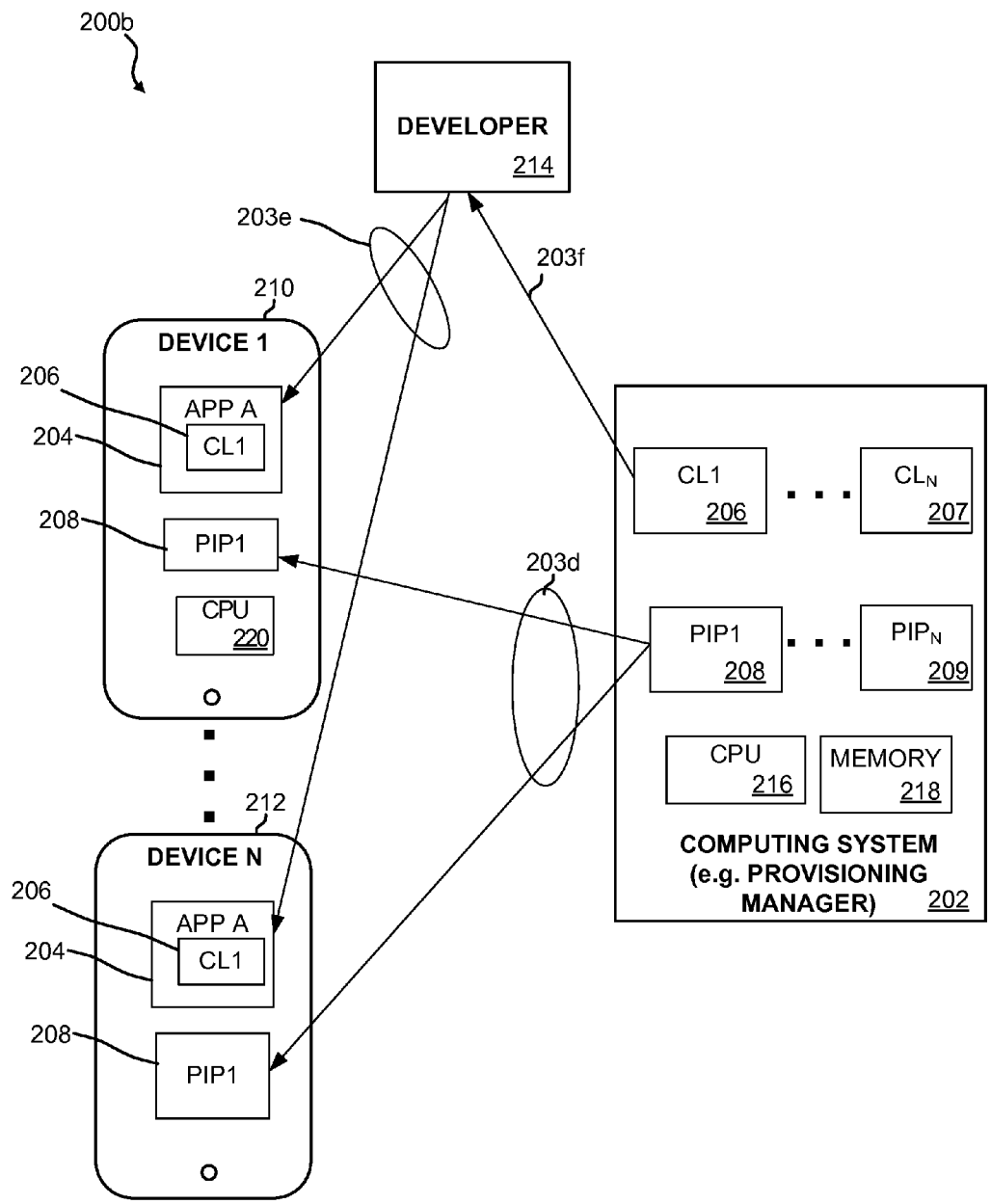
FIG. 2B is a block diagram illustrating automatic provisioning of a software platform to a device ecosystem, in accordance with another embodiment of the disclosure.

FIG. 2A is a block diagram illustrating automatic provisioning of a software platform to a device ecosystem, in accordance with an embodiment of the disclosure. FIG. 2B is a block diagram illustrating automatic provisioning of a software platform to a device ecosystem, in accordance with another embodiment of the disclosure. Referring to FIG. 2A, an example software provisioning environment 200a may comprise a plurality of N client devices 210, ..., 212, a provisioning manager 202 and a developer 214.

The provisioning manager 202 may comprise suitable logic, circuitry, interfaces, and/or code that may be operable to separate interface and implementation functionalities of an application programming interface (e.g., API 102 in FIG. 1) into a client library (e.g., CL1 206) and a corresponding platform implementation package (e.g., PIP1 208). The provisioning manager 202 may also comprise a CPU 216 and memory 218, which may be used during one or more of the provisioning functionalities disclosed herein.

The developer 214 may be a software developer who may use one or more APIs provided by the provisioning manager 202 when developing, for example, applications for use by one or more of the client devices 210, ..., 212. In an example embodiment, the developer 214 may use the client library 206 during development of application A 204. More specifically, the developer 214 may implement the client library 206 as a thin client library within the application A 204. After development is complete, the developer 214 may communicate the application A 204 to the provisioning manager 202 via the communication path 203c.

For example, the provisioning manager 202 may comprise an application store, and the developer may publish the completed application A 204 in such application store. The provisioning manager may also publish the platform implementation package (PIP1) 208 corresponding to the client library (CL1) 206. The provisioning manager 202 may further distribute (e.g., via a download) the application 204 (with the client library 206) together with the corresponding platform implementation package 208 to one or more of the plurality of client devices 210, ..., 212 via communication paths 203a, ..., 203b. For example, such distribution of the application 204 and the platform implementation package 208 may take place when one or more of the client devices 210, ..., 212 purchases the application 206 for download.

Referring to FIG. 2B, the example software provisioning environment 200b may be substantially similar to the software provisioning environment 200a with the difference being that the application 204 (with the client library 206) may be downloaded by the device 210 directly from the developer 214. For example, the provisioning manager 202 may provide access to the developer 214 to a plurality of client libraries 206, ..., 207, which correspond to platform implementation packages 208, ..., 209. The client library 206 (or any of the other client libraries) may be communicated to the developer 214 via the communication path 203f. The completed application 204 (with the client library 206) may be downloaded by devices 210, ..., 212 via communication paths 203e. The corresponding platform implementation package 208 may be downloaded by the devices 210, ..., 212 from the provisioning manager 202.

During example operation of the device 210, once the application 204 (with the client library 206) and the platform implementation package 208 are installed at device 210, a user may execute the application 204. After the application 204 is executed, the client library 206 may be used for communicating a request for a specific implementation functionality to the platform implementation package 208. Such request for functionality may be communicated to the platform implementation package 208 immediately upon starting the application 204 or at any time during which the application 204 is running. Additionally, the request for the functionality may be initiated within the device 210 because the application 204 in fact requires such functionality for one or more of its processes. The request for the functionality may also be initiated because the application 204 is attempting to verify that a corresponding platform implementation package 208 is installed and is able to provide such functionality, if required to do so by the application.

After the request for functionality is communicated to the platform implementation package 208, it may be determined whether the platform implementation package 208 requires an update. For example, a version of the client library 206 may be checked against the version of the platform implementation package 208. If the platform implementation package 208 is outdated (or is disabled or not installed), it may be concluded that the platform implementation package 208 requires an update. In response to the determining, the request for an update may be communicated to the provisioning manager 202. The provisioning manager 202 may send back the requested update to the device 210 and the platform implementation package 208 may be updated.

Figure 3:
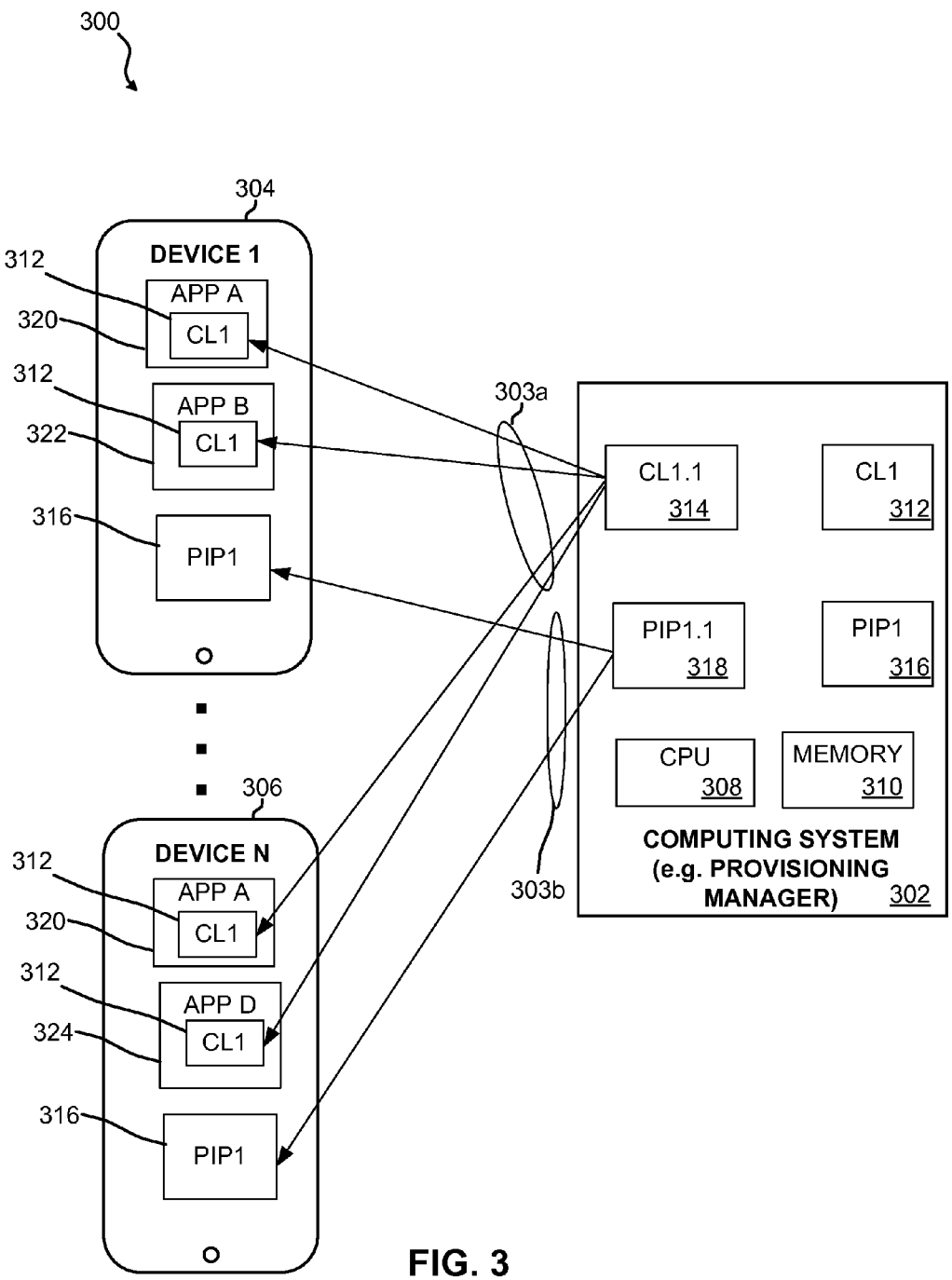
FIG. 3 is a block diagram illustrating automatic provisioning of software updates to a device ecosystem, in accordance with an embodiment of the disclosure.

FIG. 3 is a block diagram illustrating automatic provisioning of software updates to a device ecosystem, in accordance with an embodiment of the disclosure. Referring to FIG. 3, the example software provisioning environment 300 may comprise client devices 304, ..., 306 and a provisioning manager 302. The illustrated client devices 304, ..., 306 and the provisioning manager 302 may have functionalities that are substantially similar to the functionalities of the client devices 210, ..., 212 and the provisioning manager 202 in FIGS. 2A-2B, respectively.

In an example embodiment, the provisioning manager 302 may periodically publish updates of the client libraries and the corresponding platform implementation packages that it provides. For example, the provisioning manager 302 may provide (e.g., publish) an update 318 to the platform implementation package 316. Similarly, the provisioning manager 302 may provide (e.g., publish) an update 314 to the client library 312.

During example operation of the device 304, after a request for functionality is communicated to the platform implementation package 316, it may be determined whether the platform implementation package 316 requires an update. After it is determined that an update is required, the request for an update may be communicated to the provisioning manager 302. The provisioning manager 302 may then send back the requested update 318 to the device 304 (and/or to any of the other devices 306) via the communication path 303b.

In an example embodiment, the provisioning manager 302 may also provision updates 314 to the client library 312. Such updates 314 may be communicated to device 304 (and/or any of the remaining devices 306) so that the client library 312 used by any of the device applications (e.g., applications 320, 322 in device 304; applications 320 and 324 in device 306) may be updated to client library 314. The client library update 314 may be communicated via communication paths 303a, and it may be done concurrently with communication of the update 318 to the platform implementation package 316. In another embodiment of the disclosure, the client library update 314 may be done separately from the update to the platform implementation package 316.

In another example embodiment of the disclosure, the platform implementation package update 318 may be directly pushed by the provisioning manager 302 to one or more of devices 304, . . . , 306 as silent updates. The pushing of the platform implementation package update 318 to the one or more of devices 304, . . . , 306 may take place automatically, and without any action or communication from user(s) of the devices 304, . . . , 306, or applications running on such devices. For example, the platform implementation package update 318 may be automatically pushed to the one or more of devices 304, . . . , 306 on a regular 24 hour cycle.

In yet another example embodiment, the communication paths 203a, . . . , 203f, 303a, and 303b may comprise one or more wired and/or wireless communication links.

Additionally, the provisioning manager 302 and/or one or more of the devices 304, . . . , 306 within the example software provisioning environment 300 may use separate binaries for different versions (e.g., update 318) of the platform implementation package 316 in order to keep minimal footprint of the platform. More specifically, the provisioning manager 302 may deliver the platform (e.g., the platform implementation package 316) to one or more of the devices 304, . . . , 306 within the example software provisioning environment 300 in multiple binaries, broken up along functional lines, rather than a single binary. This may have the benefit of allowing incremental update or installation in a storage constrained environment, as well as limiting damage to the system by letting the user disable individual components (associated with individual binaries), rather than all functionality (if a single binary is used).

Similarly, in another example embodiment of the disclosure, the provisioning manager 302 and/or one or more of the devices 304, . . . , 306 within the example software provisioning environment 300 may also use targeted binaries for different runtime architectures, languages, and screen densities, thereby improving the bandwidth and storage impact of the services provided by the platform implementation package 316. More specifically, the provisioning manager 302 may maintain separate builds for different target platforms in order to save storage space and mobile data transmission costs. For example, native code may be compiled to the specific architecture of the targeting device. Image resources may be targeted to the specific devices display density (rather than having one in every possible density). String resources may also be limited to a set of languages supported by the device. In this regard, different binaries may be used for different platform versions, which may have libraries or assets included on newer devices (and which may not be present on older devices).

Figure 4:
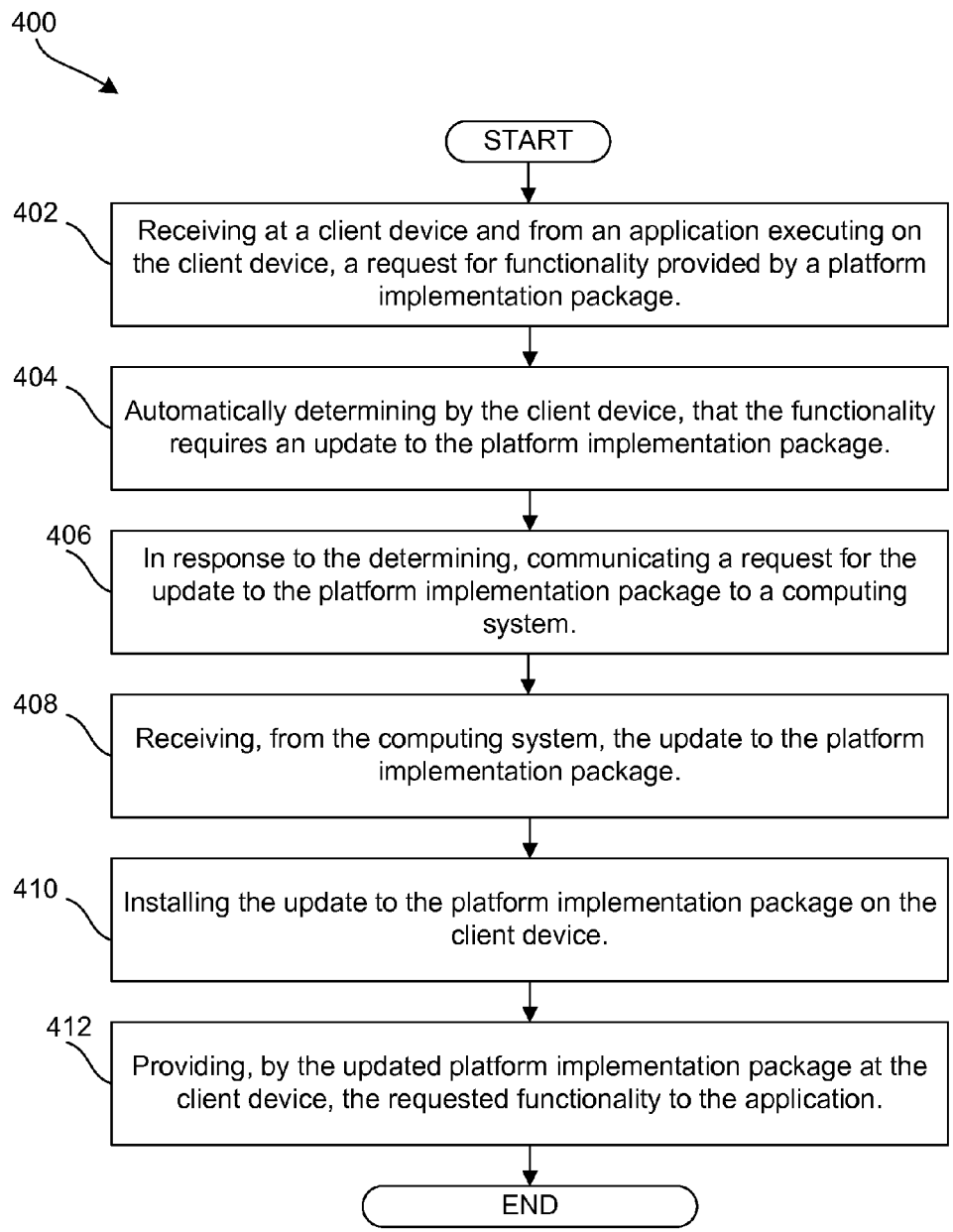
FIG. 4 is a flow chart illustrating example steps of a method for automatic provisioning of a software platform to a client device, in accordance with an embodiment of the disclosure.

FIG. 4 is a flow chart illustrating example steps of a method for automatic provisioning of a software platform to a client device, in accordance with an embodiment of the disclosure. Referring to FIGS. 2A-4, the example method 400 may start at 402, when a request for functionality may be received at a client device (e.g., 204) from an application (e.g., 204) executing on the client device (e.g., 210). The request may be received via a client library (e.g., 206) distributed with the application 204. The request may be for functionality provided by a corresponding platform implementation package (e.g., 208). The platform implementation package 208 may provide functionality that is not provided by the client library 206.

At 404, it may be automatically determined that the functionality requires an update to the platform implementation package 208. At 406, in response to the determining, a request for the update to the platform implementation package 208 may be communicated to a computing system (e.g., provisioning manager 202). At 408, the update (e.g., 318) to the platform implementation package 208 may be received from the computing system (e.g., 202). At 410, the update 318 to the platform implementation package 208 may be installed on the client device (e.g., 210). At 412, the requested functionality may be provided within the client device 202 by the updated platform implementation package 318.

The request for the functionality may be communicated to the provisioning manager 202 upon initial execution (i.e., as part of the initial execution steps) of the application 204. The request for the functionality may also be communicated after initial execution of the application 204 (e.g., after execution of the initial steps of the application, the application or client device may determine that certain additional functionality of the application 204 is not installed). The automatic determining may include determining that the platform implementation package 208 is outdated; determining that the platform implementation package 208 is not installed in the client device 210; and/or determining that the platform implementation package 208 is disabled. The determining that the platform implementation package 208 is outdated may include performing a version dependency check by comparing a version of the client library 206 with a version of the platform implementation package 208.

Prior to the communicating of the update request, a dialog interface may be displayed on the device 210 for receiving user confirmation for the update request. A method may be called in the client library 206 for the displaying of the dialog interface. An update (e.g., 314) to the client library may be received from the computing system together with the update (e.g., 318) to the platform implementation package. The request may be received via the client library (e.g., 206) using inter-process communication (IPC).

In an example embodiment, the communicating of the request for the update to the platform implementation package 208 to the computing system (e.g., 202) may be deferred (or delayed) until at least another update is required for at least another application executing on the client device 210.

Figure 5:
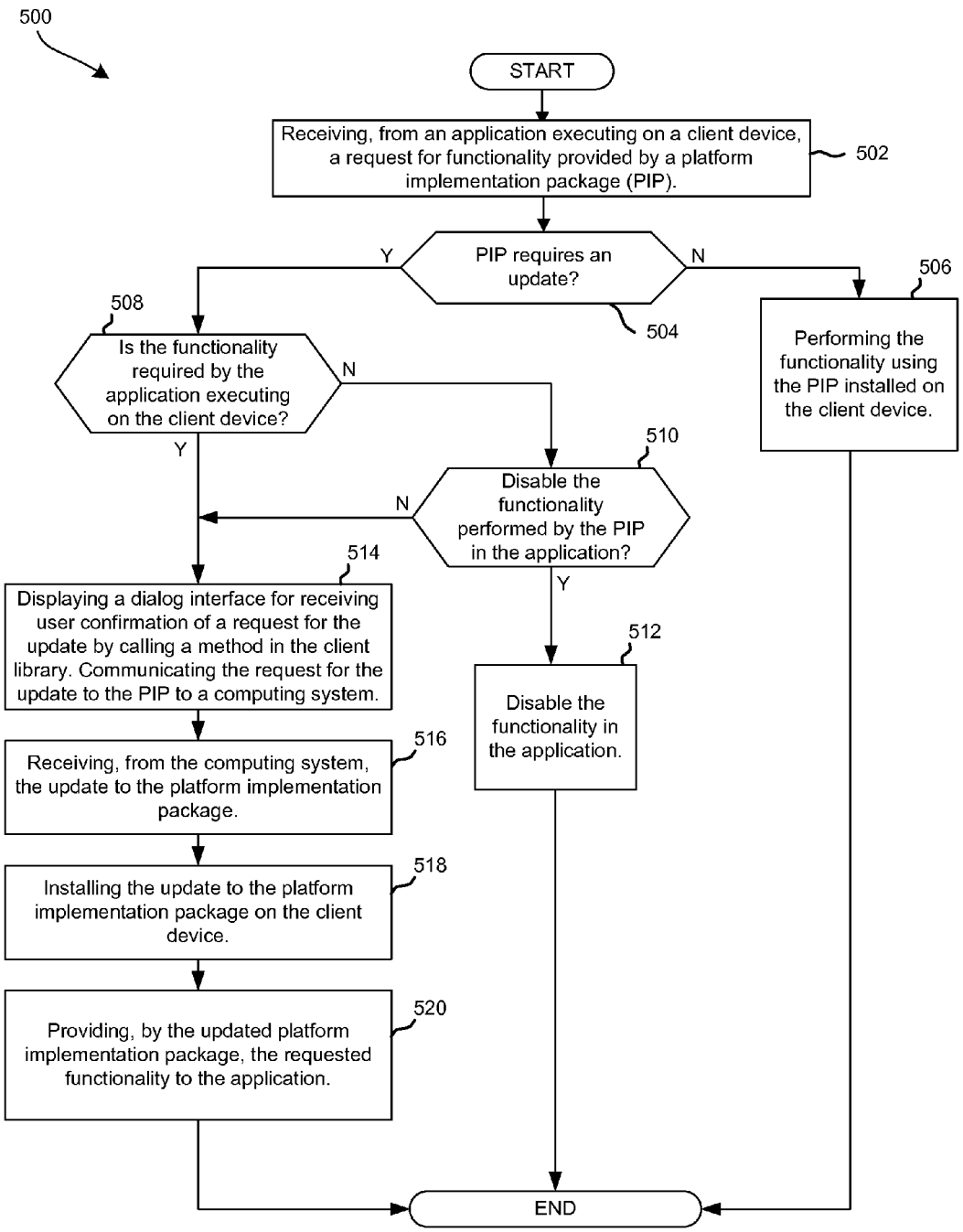
FIG. 5 is a flow chart illustrating example steps of another method for automatic provisioning of a software platform to a client device, in accordance with an embodiment of the disclosure.

FIG. 5 is a flow chart illustrating example steps of another method for automatic provisioning of a software platform to a client device, in accordance with an embodiment of the disclosure. Referring to FIGS. 2A-5, the example method 500 may start at 502, when a request for functionality may be received from an application (e.g., 204) executing on the client device (210). The request may be received via a client library (e.g., 206) distributed with the application 204, and the request may be for functionality provided by the platform implementation package (e.g., 208). At 504, it may be determined whether the platform implementation package 208 performing the functionality requires an update.

If it is determined that the platform implementation package 208 requires an update, at 508, it may be determined whether the functionality is in fact required by the application (204) executing on the client device 210. If the functionality is not required by the application (204), at 510, it may be determined whether to the disable the functionality performed by the platform implementation package 208. If it is determined that the functionality is to be disable, then at 512, the functionality is disable and the method concludes. If it is determined that the functionality should not be disabled, processing may resume at step 514.

If it is determined that the functionality is in fact required by the application (204), then at 514, a dialog interface may be displayed at the client device, for receiving user confirmation of a request for the update. The dialog interface may be displayed by calling a method in the client library. After receipt of the confirmation, the request for the update to the platform implementation package 208 may be communicated to a computing system (e.g., provisioning manager 202).

At 516, the update (e.g., 318) to the platform implementation package 208 may be received from the computing system (e.g., 202). At 518, the update 318 to the platform implementation package 208 may be installed on the client device (e.g., 210). At 520, the requested functionality may be provided within the client device 202 by the updated platform implementation package 318.

If it is determined, at 504, that the platform implementation package 208 requires an update, at 506, the functionality may be performed by the platform implementation package 208.

Figure 6:
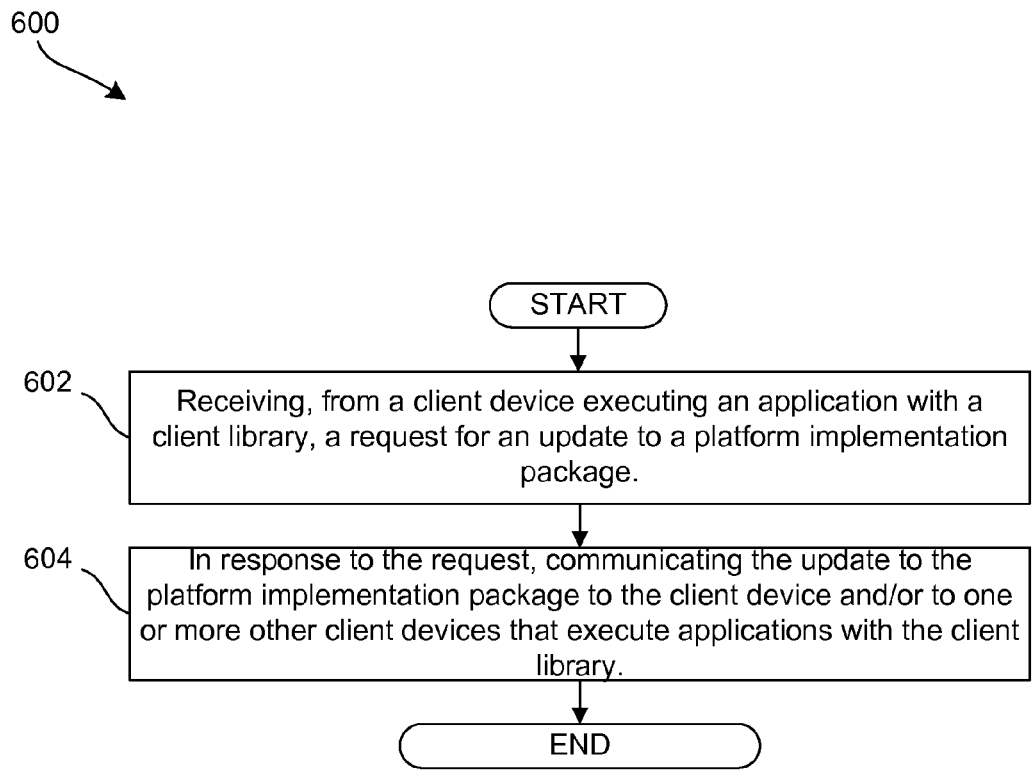
FIG. 6 is a flow chart illustrating example steps of a method for automatic provisioning of a software platform to a device ecosystem, in accordance with an embodiment of the disclosure.

FIG. 6 is a flow chart illustrating example steps of a method for automatic provisioning of a software platform to a device ecosystem, in accordance with an embodiment of the disclosure. Referring to FIGS. 2A-3 and 6, the example method 600 may start at 602, when a request for an update to a platform implementation package (e.g., 316) may be received at the provisioning manager (e.g., 302) from a client device (e.g., 304) executing an application (e.g., 320) with a client library (e.g., 312). At 604, in response to the request, the update (e.g., 318) to the platform implementation package may be communicated to the client device (304). The updated platform implementation package (318) may be operable to perform at least one functionality associated with the client library (312). The updated platform implementation package (318) may also be distributable to at least a plurality of other client devices executing corresponding applications with the client library.

The communicating of the update (318) to the platform implementation package to the client device (304) may take place automatically upon receiving the request from the client device (304). If a client library update (e.g., 314) is available, it may be communicated to one or both of the client device (304) and/or the plurality of other client devices (e.g., 306). The client library update (314) may be pushed to the client device (304) and/or the plurality of other client devices (306) as a silent update.

Referring to FIGS. 2A-3, in an example embodiment, a system for automatically provisioning a platform implementation package to a client device is disclosed and may include at least one processor (e.g., CPU 220) in a client device (e.g., 210). The CPU 220 may enable receiving of a request for functionality from an application (e.g., 204) executing on the client device (e.g., 210). The request may be received via a client library (e.g., 206) distributed with the application 204. The request may be for functionality provided by a corresponding platform implementation package (e.g., 208). The platform implementation package 208 may provide functionality that is not provided by the client library 206.

The CPU 220 may enable automatic determining that the functionality requires an update to the platform implementation package 208. In response to the determining, the CPU 220 may enable communicating a request for the update to the platform implementation package 208 to a computing system (e.g., provisioning manager 202). The CPU 220 may enable receiving of the update (e.g., 318) to the platform implementation package 208 from the computing system (e.g., 202). The CPU 220 may enable installing of the update 318 to the platform implementation package 208 on the client device (e.g., 210). The CPU 220 may enable providing of the requested functionality within the client device 202 by the updated platform implementation package 318.

The CPU 220 may enable communicating of the request for the functionality to the provisioning manager 202 upon initial execution of the application 204 or after initial execution of the application 204. The automatic determining may include determining that the platform implementation package 208 is outdated; determining that the platform implementation package 208 is not installed in the client device 210; and/or determining that the platform implementation package 208 is disabled. The determining that the platform implementation package 208 is outdated may include performing, by the CPU 220, a version dependency check by comparing a version of the client library 206 with a version of the platform implementation package 208.

Prior to the communicating of the update request, the CPU 220 may enable displaying a dialog interface on the device 210 for receiving user confirmation for the update request. The CPU 220 may enable calling a method in the client library 206 for the displaying of the dialog interface. The CPU 220 may enable receiving an update (e.g., 314) to the client library from the computing system (e.g., 202) together with the update (e.g., 318) to the platform implementation package. The request may be received via the client library (e.g., 206) using an inter-process communication (IPC).

Referring to FIGS. 2A-3, in an example embodiment, a system for automatically provisioning a platform implementation package to a client device is disclosed and may include at least one processor (e.g., CPU 216 or 308) in a computing system (e.g., provisioning manager 202 or 302). The CPU 308 may enable receiving a request for an update to a platform implementation package (e.g., 316) at the provisioning manager (e.g., 302) from a client device (e.g., 304) executing an application (e.g., 320) with a client library (e.g., 312). In response to the request, the CPU 308 may enable communicating the platform implementation package update (e.g., 318) to the client device (304). The updated platform implementation package (318) may be operable to perform at least one functionality associated with the client library (312). The CPU 308 may also enable distributing of the updated platform implementation package (318) to at least a plurality of other client devices (e.g., 306) executing corresponding applications with the client library (320).

The CPU 308 may enable communicating of the update (318) to the platform implementation package to the client device (304) automatically upon receiving the request from the client device (304). If a client library update (e.g., 314) is available, the CPU 308 may enable communicating the update (e.g., 314) to one or both of the client device (304) and/or the plurality of other client devices (e.g., 306). The CPU 308 may further enable pushing the client library update (314) to the client device (304) and/or the plurality of other client devices (306) as a silent update.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for automatically provisioning a platform implementation package to a client device.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a generalpurpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method comprising:
    communicating, by a client device and to a computing system, a request for an update to a platform implementation package of a multi-part application programming interface (API), wherein:
        the multi-part API provides one or more interface functionalities for interfacing with the multi-part API and provides one or more implementation functionalities for an application that is installed on the client device,
        the one or more interface functionalities are implemented in a client library that is configured to execute on the client device and is separate from the platform implementation package, and
        the one or more implementation functionalities are implemented in the platform implementation package;
    receiving, by the client device and from the computing system, the update to the platform implementation package; and
    installing the update to the platform implementation package on the client device.

2. The method of claim 1, further comprising:
    determining, by the client device, that the update to the platform implementation package is required; and
    in response to determining that the update to the platform implementation package is required, communicating the request for the update to the platform implementation package to the computing system.

3. The method of claim 2, wherein determining that the update to the platform implementation package is required comprises determining that a version of the client library is different from a version of the platform implementation package.

4. The method of claim 2, further comprising determining that the update to the platform implementation package is required in response to receiving a request for an implementation functionality of the one or more implementation functionalities.

5. The method of claim 4, wherein the client library corresponds to the application installed on the device, and the method further comprises communicating the request for the implementation functionality after initial execution of the application by the client device.

6. The method of claim 2, wherein communicating the request for the update to the platform implementation package to the computing system in response to determining that the update to the platform implementation package is required comprises:
    providing, by the client device, a dialog interface in response to determining that the update to the platform implementation package is required, and
    communicating the request for the update to the platform implementation package after receipt of confirmation via the dialog interface.

7. The method of claim 1, wherein the update to the platform implementation package is received in multiple binaries rather than a single binary, wherein individual binaries of the multiple binaries correspond to respective implementation functionalities of the one or more implementation functionalities.

8. The method of claim 1, wherein the platform implementation package is distributable to a plurality of other client devices having corresponding client libraries.

9. A non-transitory computer readable medium having stored therein instructions, that when executed by a client device, cause the client device to perform functions comprising:
    communicating to a computing system a request for an update to a platform implementation package of a multi-part application programming interface (API), wherein:
        the multi-part API provides one or more interface functionalities for interfacing with the multi-part API and provides one or more implementation functionalities for an application that is installed on the client device,
        the one or more interface functionalities are implemented in a client library that is configured to execute on the client device and is separate from the platform implementation package, and
        the one or more implementation functionalities are implemented in the platform implementation package;
    receiving from the computing system the update to the platform implementation package; and
    installing the update to the platform implementation package on the client device.

10. The non-transitory computer-readable medium of claim 9, wherein the functions further comprise:
    determining that the update to the platform implementation package is required; and
    in response to determining that the update to the platform implementation package is required, communicating the request for the update to the platform implementation package to the computing system.

11. The non-transitory computer-readable medium of claim 10, wherein determining that the update to the platform implementation package is required comprises determining that a version of the client library is different from a version of the platform implementation package.

12. The non-transitory computer-readable medium of claim 10, wherein the functions further comprise determining that the update to the platform implementation package is required in response to receiving a request for an implementation functionality of the one or more implementation functionalities.

13. The non-transitory computer-readable medium of claim 12, wherein the client library corresponds to the application installed on the device, and the functions further comprise communicating the request for the implementation functionality after initial execution of the application by the client device.

14. The non-transitory computer-readable medium of claim 10, wherein communicating the request for the update to the platform implementation package to the computing system in response to determining that the update to the platform implementation package is required comprises:
providing a dialog interface in response to determining that the update to the platform implementation package is required, and
communicating the request for the update to the platform implementation package after receipt of confirmation via the dialog interface.

15. A computing device, comprising:
a processor; and
a computer-readable medium, configured to store instructions, that when executed by the processor, cause the computing device to perform functions comprising:
communicating to a computing system a request for an update to a platform implementation package of a multi-part application programming interface (API), wherein:
the multi-part API provides one or more interface functionalities for interfacing with the multi-part API and provides one or more implementation functionalities for an application that is installed on the computing device,
the one or more interface functionalities are implemented in a client library that is configured to execute on the computing device and is separate from the platform implementation package, and
the one or more implementation functionalities are implemented in the platform implementation package;
receiving from the computing system the update to the platform implementation package, and
installing the update to the platform implementation package on the computing device.

16. The computing device of claim 15, wherein the functions further comprise:
determining that the update to the platform implementation package is required, and
in response to determining that the update to the platform implementation package is required, communicating the request for the update to the platform implementation package to the computing system.

17. The computing device of claim 16, wherein determining that the update to the platform implementation package is required comprises determining that a version of the client library is different from a version of the platform implementation package.

18. The computing device of claim 16, wherein the functions further comprise determining that the update to the platform implementation package is required in response to receiving a request for an implementation functionality of the one or more implementation functionalities.

19. The computing device of claim 18, wherein the client library corresponds to the application installed on the device, and the functions further comprise communicating the request for the implementation functionality after initial execution of the application by the computing device.

20. The computing device of claim 16, wherein communicating the request for the update to the platform implementation package to the computing system in response to determining that the update to the platform implementation package is required comprises:
providing a dialog interface in response to determining that the update to the platform implementation package is required, and
communicating the request for the update to the platform implementation package after receipt of confirmation via the dialog interface.

* * * * *